United States Patent
Bell (10) Patent No.: US 12,442,641 B1
(45) Date of Patent: Oct. 14, 2025

(54) INTELLIGENT STRUCTURAL AND SPATIAL 3D REALTIME GUIDANCE AND TRAINING SECURITY SYSTEM THAT UTILIZES 3D MODELS AND 2D MAPS OF FACILITIES FOR TRAINING AND TO INFORM AND GUIDE AUTHORITIES RESPONDING TO EMERGENCIES

(71) Applicant: Maria Caroline Bell, Sioux Falls, SD (US)

(72) Inventor: Maria Caroline Bell, Sioux Falls, SD (US)

( * ) Notice: Subject to any disclaimer, the term of this patent is extended or adjusted under 35 U.S.C. 154(b) by 371 days.

(21) Appl. No.: 18/116,797

(22) Filed: Mar. 2, 2023

Related U.S. Application Data (60) Provisional application No. 63/393,826, filed on Jul. 30, 2022.

(51) Int. Cl.
| | |
|---|---|
| *G06V 20/20* | (2022.01) |
| *G01C 21/20* | (2006.01) |
| *G01S 17/89* | (2020.01) |
| *G06T 17/05* | (2011.01) |
| *B64U 101/30* | (2023.01) |

(52) U.S. Cl.
CPC ............ *G01C 21/206* (2013.01); *G01S 17/89* (2013.01); *G06T 17/05* (2013.01); *B64U 2101/30* (2023.01)

(58) Field of Classification Search
CPC ........ G06F 16/21; G06F 21/44; G06F 16/248; G06F 16/2455; H04L 65/401; H04L 9/40; H04M 3/56; H04N 21/2187; H04N 21/44; G06V 20/20; G06V 40/19; G06V 40/10; G06V 40/20; G06N 20/00; G06N 3/08; G06N 3/09; H04W 12/02; H04W 12/63
See application file for complete search history.

(56) References Cited

U.S. PATENT DOCUMENTS

| | | | |
|---|---|---|---|
| 10,769,844 B1 * | 9/2020 | Rezvani | .................. G06T 17/05 |
| 12,014,433 B1 * | 6/2024 | Pearson | .................. G06F 3/011 |
| 2009/0100165 A1 | 4/2009 | Wesley et al. | |
| 2011/0249008 A1 | 10/2011 | Keene et al. | |
| 2017/0253330 A1 | 9/2017 | Saigh et al. | |

FOREIGN PATENT DOCUMENTS

WO    WO-2018204807 A1 * 11/2018 ........... G05D 1/0016

OTHER PUBLICATIONS

International Search Report and Written Opinion issued on Oct. 24, 2023 in corresponding PCT Application No. PCT/US23/29069 (7 pages).

* cited by examiner

*Primary Examiner* — Tu X Nguyen
(74) *Attorney, Agent, or Firm* — Plager Schack LLP; Mark H. Plager; Stephen Hallberg (57) ABSTRACT

A security system configured to use three-dimensional (3D) scanning for security of buildings, locations, properties, or any other facility is disclosed. The use of 3D scanning by the security system allows authorities the ability to immediately download a 3D interactive model of any building, structure, property, or other facility. The security system is also configured to provide a link to a precise area of the 3D model which can be texted to police so they can actually see an approximate location of an assailant or perpetrator within the 3D model representation of an interior of the facility before they even enter it.

19 Claims, 5 Drawing Sheets

INTELLIGENT STRUCTURAL AND SPATIAL 3D REALTIME GUIDANCE AND TRAINING SECURITY SYSTEM THAT UTILIZES 3D MODELS AND 2D MAPS OF FACILITIES FOR TRAINING AND TO INFORM AND GUIDE AUTHORITIES RESPONDING TO EMERGENCIES

CLAIM OF BENEFIT TO PRIOR APPLICATION

This application claims benefit to U.S. Provisional Patent Application 63/393,826, entitled "A SECURITY SYSTEM CONFIGURED TO USE 3D SCANNING FOR SECURITY OF BUILDINGS, LOCATIONS, PROPERTIES, OR ANY OTHER FACILITY AND TO PINPOINT AN APPROXIMATE LOCATION WITHIN THE 3D MODEL OF AN ASSAILANT FOR AUTHORITIES TO RECEIVE WIRELESS BEFORE ENTRY," filed Jul. 30, 2022. The U.S. Provisional Patent Application 63/393,826 is incorporated herein by reference.

BACKGROUND

Embodiments of the invention described in this specification relate generally to security systems, and more particularly, to an intelligent structural and spatial three-dimensional (3D) realtime guidance and training security system and processes are disclosed in which the intelligent structural and spatial 3D realtime guidance and training security system utilizes 3D models and two-dimensional (2D) maps to inform and guide authorities during emergencies and for training of personnel.

Active criminal incidents which require immediate intervention by location-based security, external private security, police, fire, rescue, and/or other authorities (hereinafter referred to individually and collectively as "authorities" or "relevant authorities") are common. Soft targets of criminals such as schools, hospitals, retail stores in general do not have good security. Any breech of these types of facilities can take hours for authorities to intervene and successfully eliminate the threat. Often times the delay in the ability to eliminate the threat will lead to significant loss of innocent life.

When police or other law enforcement authorities are dispatched to an ongoing criminal site, all they can see is the exterior of the building. They are unable to see the immediate interior surroundings of the facility.

Therefore, what is needed is a way to allow authorities, such as police, fire, rescue, etc., to immediately download a three-dimensional (3D) interactive model of any building, structure, or property that can be sent digitally (via text message or other electronic means) to police or other law enforcement authorities or fire, rescued, etc., so they can actually see the interior of the facility before they even enter it, and to enable a way to highlight a known alert area, such as when it is known where an assailant or perpetrator is located, the 3D interactive model will be configured to include a link to the precise area of the model.

BRIEF DESCRIPTION

An intelligent structural and spatial three-dimensional (3D) realtime guidance and training security system and processes are disclosed that utilize 3D models and two-dimensional (2D) maps of buildings, locations, properties, or other facilities (hereinafter referred to individually as "facility" and collectively as "facilities") to inform authorities responding to emergencies of an approximate location of an assailant and guide responders to the approximate location of the assailant, and for training personnel, and providing additional information in realtime about such facilities.

In some embodiments, the intelligent structural and spatial 3D realtime guidance and training security system comprises a composite facility model, a facility guidance and training application, a remote emergency dispatch server that runs a facility model service, an artificial intelligence (AI) system, and an image recognition AI module of the AI system. In some embodiments, emergency dispatch services are authorized to apply a crisis location pin to a particular location within a composite facility model which guides authorized users to an approximate location of a crisis.

In some embodiments, the composite facility model comprises (i) a 3D facility model that is based on scanning a facility, (ii) a 2D facility map that is based on one or more images from aerial drone views of the facility, and (iii) authorized user information. In some embodiments, the composite facility model further comprises a live orientation compass that assists a user with model orientation in a facility. In some embodiments, scanning the facility comprises 3D scanning of the facility. In some embodiments, 3D scanning of the facility comprises utilizing a light detection and ranging (LiDAR) scanning system (also referred to as a "laser imaging, detection, and ranging" scanning system). In some embodiments, the composite facility model is an encrypted file that packages together the 3D facility model, the 2D facility map, facility information, and the authorized user information in a format readable by the facility guidance and training application.

In some embodiments, the AI system is communicably connected to the remote emergency dispatch server that runs a facility model service. In some embodiments, the AI system is configured to provide facility information to responders in realtime. In some embodiments, the AI system comprises the image recognition AI module. In some embodiments, the image recognition AI module is configured to (i) evaluate an image of particular structural aspect at the facility, (ii) identify a corresponding structural aspect in the 3D facility model, (iii) retrieve specific information about the corresponding structural aspect from the facility information and a map location of the corresponding structural aspect in the 2D facility map, (iv) identify a user orientation and corresponding structural aspect location at which to position a location marker in the composite facility model to orient the user of the facility guidance and training application as to their approximate current location and the approximate location of the corresponding structural aspect within the facility, and (v) provide, to the facility model service, realtime requested data to transmit to the requesting device of the requesting authorized user.

In some embodiments, the intelligent structural and spatial 3D realtime guidance and training security system is utilized by authorities and responders during a live crisis at a particular facility.

In some embodiments, the intelligent structural and spatial 3D realtime guidance and training security system is utilized for training by authorities and responders.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel intelligent structural and spatial 3D realtime guidance and training security system and processes that utilize 3D models and 2D maps of facilities to inform authorities responding to emergencies of an approximate location of an assailant and guide responders to the approximate location of the assailant, and for training personnel, and providing additional information in realtime about such facilities.

In some embodiments, the intelligent structural and spatial 3D realtime guidance and training security system comprises a composite facility model, a facility guidance and training application, a remote emergency dispatch server that hosts a facility model service, an artificial intelligence (AI) system that is configured to provide realtime information to responders at the facility, and an image recognition AI module that is configured to compare images of particular structural aspects captured by cameras of user devices taken by responders at the facility of the AI system.

In some embodiments, the facility guidance and training application is a software that runs on a device of an authorized user and is configured to render and display the composite facility model on a screen of the device. In this way, the authorized user is able to view and interact with the composite facility model in any type of scenario including, without limitation, emergency scenarios, training scenarios, etc.

In some embodiments, the facility model service is configured to distribute facility models to authorized users when running on the remote emergency dispatch server. In some embodiments, emergency dispatch services are authorized to apply a crisis location pin to a particular location within the facility model which guides the authorized users who receive the facility model an approximate location within the facility of the emergency.

In some embodiments, the composite facility model comprises (i) a 3D facility model that is based on scanning a facility, (ii) a 2D facility map that is based on one or more images from aerial drone views of the facility, and (iii) authorized user information. In some embodiments, the composite facility model further comprises a live orientation compass that assists a user with model orientation in a facility. In some embodiments, scanning the facility comprises 3D scanning of the facility. In some embodiments, 3D scanning of the facility comprises utilizing a LiDAR scanning system. In some embodiments, the composite facility model is an encrypted file that packages together the 3D facility model, the 2D facility map, facility information, and the authorized user information in a format readable by the facility guidance and training application. In some embodiments, the encrypted composite facility model is also packaged with the live orientation compass and one or more crisis location pin(s) applied to the facility model by authorized emergency dispatch services personnel, servers, or systems.

In some embodiments, the AI system is communicably connected to the remote emergency dispatch server hardware platform on which the facility model service runs as a network accessible service. In some embodiments, the AI system is configured to provide facility information to authorized users in realtime. In some embodiments, the AI system utilizes the image recognition AI module to provide enhanced facility information to the authorized users. In some embodiments, the image recognition AI module is configured to (i) evaluate an image of particular structural aspect at the facility, (ii) identify a corresponding structural aspect in the 3D facility model, (iii) retrieve specific information about the corresponding structural aspect from the facility information and a map location of the corresponding structural aspect in the 2D facility map, (iv) identify a user orientation and corresponding structural aspect location at which to position a location marker in the composite facility model to orient the user of the facility guidance and training application as to their approximate current location and the approximate location of the corresponding structural aspect within the facility, and (v) provide, to the facility model service, realtime requested data comprising (a) the identified user orientation and corresponding structural aspect location, (b) specific information and the map location of the corresponding structural aspect in the 2D facility map, and (c) a 3D image of the corresponding structural aspect for the facility model service to transmit to the requesting device of the requesting authorized user. Upon receiving the realtime requested data, the facility guidance and training application renders the data in a view of the composite facility model displayed on the screen of the device operated by the authorized user.

In some embodiments, the intelligent structural and spatial 3D realtime guidance and training security system is utilized by authorities and responders during a live crisis at a particular facility.

In some embodiments, the intelligent structural and spatial 3D realtime guidance and training security system is utilized for training by authorities and responders.

As stated above, active criminal incidents which require immediate intervention by law enforcement, fire, and/or rescue authorities are common. Soft targets of criminals such as schools, hospitals, retail stores in general do not have good security. Any breech of these types of facilities can take hours for relevant authorities to intervene and successfully eliminate the threat. Often times the delay in the ability to eliminate the threat will lead to significant loss of innocent life. Embodiments of the intelligent structural and spatial 3D realtime guidance and training security system described in this specification solve such problems by assisting the relevant authorities to receive, visualize, and interact with a 3D model of any structure, building, property, or other facility. Specifically, the 3D model is made available to the authorities for immediate downloadable, viewing, and interaction.

Embodiments of the intelligent structural and spatial 3D realtime guidance and training security system described in this specification differ from and improve upon currently existing options. In particular, some embodiments differ from existing security systems which only have a current ability in which authorities, such as law enforcement, can only view an exterior of a facility, such that after the authorities are dispatched to an active crime scene, the ability to gain insights into the ongoings inside the facility is next to nothing. This is a consequence of only having the current ability to visualize the outside of a facility. Thus, law enforcement and other authorities need to be trained to do rescues in mock facilities (which cannot foresee real-life scenarios). Since training of law enforcement typically would not have been done with such real-life criminal activity in an actual live scene, law enforcement authorities are at a disadvantage. In other words, not having the ability to see the actual interior of a facility results in slowing or inhibiting rescue operators because they are unfamiliar with the interior of the building or facility. Thus, time is typically wasted just getting the "lay of the land" from the exterior perspective of the facility. By contrast, the intelligent structural and spatial 3D realtime guidance and training security system of the present disclosure would allow authorities to immediately download a 3D interactive model of any facility. If it is known where the assailant is, a link to the precise area of the 3D model can be texted to police so they can actually see the interior of the facility before they even enter it.

The intelligent structural and spatial 3D realtime guidance and training security system of the present disclosure may involve an associated process and be comprised of the following elements. This associated process and the list of possible constituent elements is intended to be exemplary only and it is not intended that this process or this list be used to limit the intelligent structural and spatial 3D realtime guidance and training security system of the present application to just these steps of the process, just this process, and/or just these elements and components. Persons having ordinary skill in the art relevant to the present disclosure may understand there to be equivalent elements, components, steps, and/or processes that may be substituted within the present disclosure without changing the essential function or operation of the intelligent structural and spatial 3D realtime guidance and training security system.

1. Scanning (3D scanning) of a facility
2. Generating a 3D facility model based on the 3D scanning
2. Maintenance updating of the scan
3. Training of police/fire/rescue on how to access scans for training
4. Monitoring center which can download maintained 3D models to appropriate police/fire/rescue The various elements and steps of the process for the intelligent structural and spatial 3D realtime guidance and training security system of the present disclosure may be related in the following exemplary fashion. It is not intended to limit the scope or nature of the relationships between the various elements and/or steps and the following examples are presented as illustrative examples only.

1. Performing 3D scan of facility. This is a "boots on the ground" procedure of having my company physically scan the facility. This scan is edited and saved on a secure cloud platform.
2. Maintenance and updating scans will be performed annually or more if significant changes have occurred in the scanned facility.
3. Authorities (e.g., police, fire, rescue) of the community in which the scanned facility resides will be trained on how to access the scanned models, how to download when the scans are dispatched, and will be allowed to use the models for training purposes.
4. A central server or cloud application service is responsible for monitoring alerts coming in, and dispatching models to the appropriate authorities who are being dispatched to the active scene.

Figure 1:
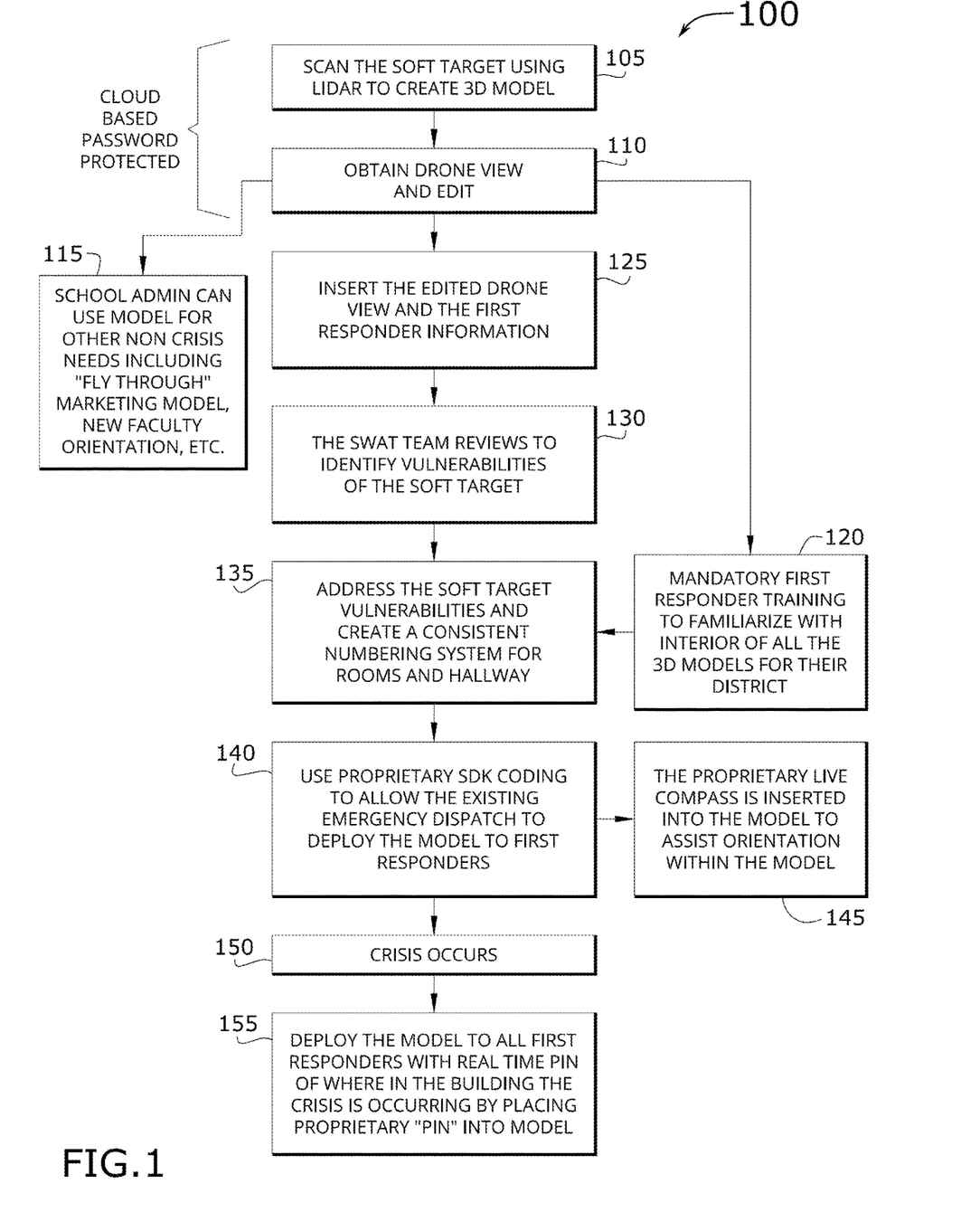
FIG. 1 conceptually illustrates an intelligent structural and spatial 3D realtime guidance and training security process in some embodiments.

By way of example, FIG. 1 conceptually illustrates an intelligent structural and spatial 3D realtime guidance and training security process 100 in some embodiments. As shown in this figure, the intelligent structural and spatial 3D realtime guidance and training security process 100 of some embodiments requires users to validly access a cloud service (namely, the facility model service). In some embodiments, valid access is verified by an authentication process that evaluates user credentials (e.g., username and password) to verify that each user accessing the facility model service is an authorized user. In some embodiments, authorized users can access the facility model service to create new 3D facility models (by scanning interiors/exteriors of facilities, also referred to as "soft targets"). Thus, upon verified authentication, an authorized user can create a new 3D facility model by scanning the soft target by a scanning system, such as a LiDAR scanning system (at 105).

After the LiDAR scanning of the soft target is completed, the next step of the intelligent structural and spatial 3D realtime guidance and training security process 100 is performed by obtaining a drone view of the soft target (at 110). In some embodiments, the drone view of the soft target comprises a zoom-scaled image that a user may manipulate to zoom in and out for greater detail or broader views of the facility from a top perspective view, and may reorient according to need. Also, a drone view of the soft target implies usage of an aerial drone to capture one or more images and/or videos of the soft target from a position above the soft target. However, a drone is not a requirement, since a drone view can be captured by a handheld camera in which a user of the camera is positioned at a higher elevation than the soft target, such as on a roof or high floor of a nearby taller building, on a ladder (such as a ladder of a suitable equipped fire truck), on scaffolding erected high enough to capture imagery of the soft target from above, or other such manners of elevation. Furthermore, after the drone view is captured (at 110), the one or more image(s) and/or video(s) can be edited as needed.

In some embodiments, the 3D facility model and/or the drone view of the soft target can be used by facility administrators for non-crisis, non-emergency, non-training situations (at 115). Examples of non-crisis, non-emergency, non-training situations include, without limitation, school administrators using the 3D facility model and drone view of a school (the school being the soft target of the LiDAR scanning) as a 'fly through' marketing model, or for new facility orientation, etc.

On the other hand, the 3D facility model and drone view of the soft target can be used by first responders, such as police, for non-crisis, non-emergency training situations (at 120). First instance, setting the 3D facility model and drone view up for mandatory first responder training so as to familiarize the first responders with a newly constructed facility in their district, especially the interior portions of the new facility, or to familiarize new first responders (new hires, transfers from other districts, etc.) with all of the facilities (especially for training in connection with the 3D facility model for interior) in that district.

Now, turning back to the intelligent structural and spatial 3D realtime guidance and training security process 100, after obtaining (and possibly editing) the drone view (at 110), the drone view and first responder information is inserted as part of (or added to another view of) the 3D facility model (at 125). After inserting the drone view (which is a 2D facility map view) to the 3D facility model, the intelligent structural and spatial 3D realtime guidance and training security process 100 proceeds to the next step at which a special weapons and tactics (SWAT) team reviews the 3D facility model and drone view to identify vulnerabilities of the soft target (at 130). While the intelligent structural and spatial 3D realtime guidance and training security process 100 refers to review by a special weapons and tactics (SWAT) team, it is also possible for this step to be performed by another specialist group or other personnel with specific knowledge of possible vulnerabilities in any domain and, therefore, may review the 3D facility model and drone view of the facility instead of the SWAT team.

In some embodiments, the intelligent structural and spatial 3D realtime guidance and training security process 100 transitions next to a step for addressing (at 135) the identified vulnerabilities of the soft target (such as by a numbering, lettering, color-coded, or other addressing scheme). In some embodiments, addressing (at 135) involves creating a consistent numbering system for rooms and hallways. In some embodiments, the addressing and numbering system is incorporated as data in the facility information packaged together with the 3D facility model, the 2D facility map, and the first responder information, resulting in creation of the composite facility model that is ready to be deployed in the field for emergencies or during training of first responders.

Next, the intelligent structural and spatial 3D realtime guidance and training security process 100 of some embodiments uses proprietary coding to allow existing (local or jurisdictional) emergency dispatch unit to transmit and deploy the composite facility model to authorized users (at 140), such as first responders at the site of a crisis at a local facility or to other first responders who are engaged in training. In particular, deployment of the composite facility model to the existing emergency dispatch unit involves uploading the encrypted composite facility model to a remote emergency dispatch server hardware platform managed by the existing emergency dispatch unit. In some embodiments, uploading the encrypted composite facility model to the remote emergency dispatch server hardware platform is followed by transmission of a decryption key pair (i.e., username/password) to pre-approved authorized emergency dispatch personnel. The decryption key paid provided to the authorized emergency dispatch personnel is different from the user credentials that each authorized user (first responder) uses to access, view, and interact with the composite facility model via the facility guidance and training application on their device. In some embodiments, the user credentials of each authorized user and the decryption key pair provided to the authorized emergency dispatch personnel correspond to specific, limited user access rights that define a level of user access, viewing, and interaction possible with respect to each and every composite facility model, rights to create new 3D facility models and drone views, composite facility model and information transmission rights, etc. In this way, any authorized user is able to extract and decrypt the 3D facility model, the 2D facility map (drone view), and the first responder information (and other information when provided, such as live orientation compassed and pinned location element(s), information markers, etc.) from the composite facility model on the user device. However, the usage of the composite facility model contents (e.g., 3D facility model, 2D facility map, other information) is accessible only via permissions that allow such access, even when the composite facility model is extracted and decrypted. For instance, an emergency dispatch unit worker may have permissions to view the 3D facility model and 2D facility map, as well as deploy (transmit) the composite facility model to a team of authorized users (first responders, etc.), but may be prevented from interacting with the 3D facility model and/or 2D facility map in ways that would be common for a first responder at the site of a crisis at the facility and not in other ways, such as updating or changing content within either the 3D facility model and/or 2D facility map; however, a first responder may be permitted a much broader stroke of access, viewing, and interaction rights to both the 3D facility model and the 2D facility map. Thus, while it is possible for authorized users to visually output the 3D facility model extracted and decrypted from the composite facility model on a screen of their respective user device (whether first responder or emergency dispatch personnel or other authorized user, such as a principle demonstrating fly through marketing and what not), those specific permissions associated with their user credentials are consequential to usage as opposed to encryption, which prevents complete unknown users (e.g., hackers) from capturing the stream data as it is transmitted from one device to any other device over a network.

In some embodiments, the intelligent structural and spatial 3D realtime guidance and training security process 100 also includes a step for inserting a live orientation compass as a visible element of the composite facility model (at 145) to assist authorized users with orientation within the model. In some embodiments, the live orientation compass is added as a fluid layer of the overall composite facility model. In some embodiments, the fluid layer is configured to detect an orientation of the composite facility model with respect to an orientation of the user device on which the model is displayed as the operator (authorized user) holds or otherwise operates the user device to view and/or interact with the facility model. In some embodiments, the live orientation compass maintains a clear and consistent view of direction by way of a compass sensor embedded in the user device. In some embodiments, the compass sensor operates with respect to geospatial position of the first responder (operator of the device) as tracked by an embedded global positioning system (GPS) sensor that calculates relative geospatial position of the device in realtime based on location data received from GPS satellites and/or by triangulation, such as between two or more cell/communication towers. In some embodiments, the live orientation compass maintains a clear and consistent view of direction and elevation by way of a gyroscope embedded in the user device with respect to the geospatial position of the first responder as tracked by the GPS sensor embedded in the device. In some embodiments, the live orientation compass determines a difference between a view of the composite facility model and a known direction of the device compass/gyroscopic sensor (such as due North) and provides a visual queue to reorient the authorized user (operator) as to a current and intended direction, such as the direction that leads toward the approximate location of the crisis, assailant, etc.

In some embodiments, the intelligent structural and spatial 3D realtime guidance and training security process 100 triggers action when a crisis occurs (at 150) such that the existing emergency dispatch unit deploys the composite facility model from the remote emergency dispatch server hardware platform to all first responders dispatched to the crisis (at 155). In some embodiments, the remote emergency dispatch server hardware platform automatically deploys the composite facility model to all of the dispatched first responders upon identification of a location of the crisis and personnel dispatched to the scene. In some embodiments, the composite facility model is updated to add a fluid layer with a realtime pin visual element that visually highlights an approximate location in or around the facility in which the crisis is centered (at 155). By placing the 'pin' into the facility model, the first responders can quickly identify where the crisis is happening and perform their live action duties as first responders. Since the 'pin' is a visual element of a fluid layer, the 'pin' (or visual element) is updated in realtime when/if the location of the crisis changes (e.g., such as when an assailant is running down a hallway in the facility, so the 'pin' placement moves accordingly in the view of the composite facility model).

Thus, as the intelligent structural and spatial 3D realtime guidance and training security process 100 demonstrates, the intelligent structural and spatial 3D realtime guidance and training security system of the present disclosure generally works by 3D scanning of a facility for subsequent use in immediate active ongoing crimes, along with obtaining (or capturing) a drone view (or 2D map view) of the facility from a top-down perspective. An example of a drone view 2D facility map is described below, by reference to FIG. 2. The intelligent structural and spatial 3D realtime guidance and training security system provides a unique and immediately interactive model, downloadable to any mobile or non-mobile device to authorized authorities to assist knowledge of the interior or exterior of a facility/property. An example of a 3D facility model with markers is described below, by reference to FIG. 3. The intelligent structural and spatial 3D realtime guidance and training security system will be continuously monitored and updated regularly to get the most accurate information to the appropriate rescue team.

Figure 2:
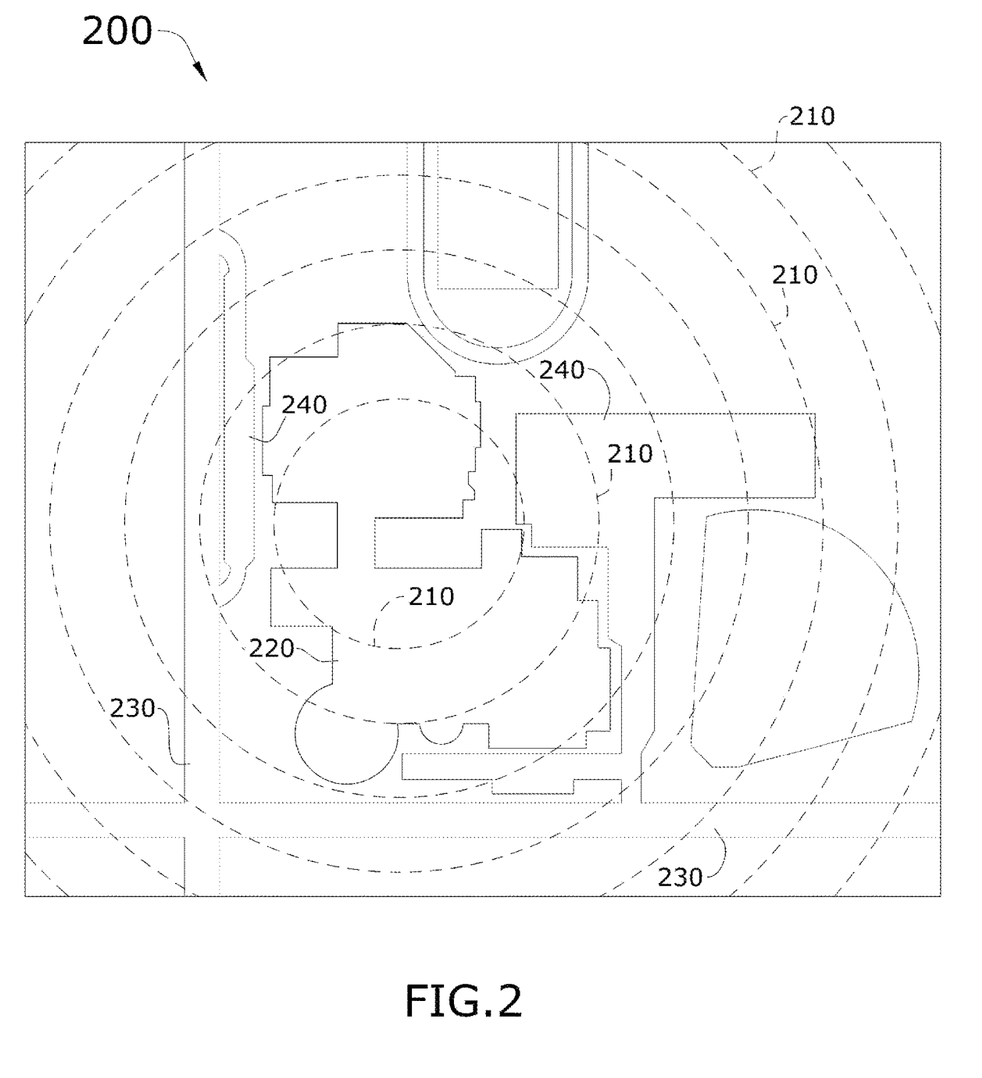
FIG. 2 conceptually illustrates a drone view 2D facility map in some embodiments.

By way of example, FIG. 2 conceptually illustrates a drone view 2D facility map 200 in some embodiments. As shown in this figure, the drone view 2D facility map 200 demonstrates multiple distance markers 210, an outline of a facility 220, roads 230 nearby the facility 220, and parking lots 240 at the facility 220. In some embodiments, the distance markers 210 are demonstrated as concentric circles of increasing radius from an approximate location of the crisis at or in the facility 220. In some embodiments, the distance between each concentric circle corresponds to a physical distance at the facility 220. For example, a one inch distance between two concentric circle distance markers 210 may correspond to a physical distance of twenty meters. In this way, first responders can gauge their approximate distance from the crisis as they approach the facility.

Figure 3:
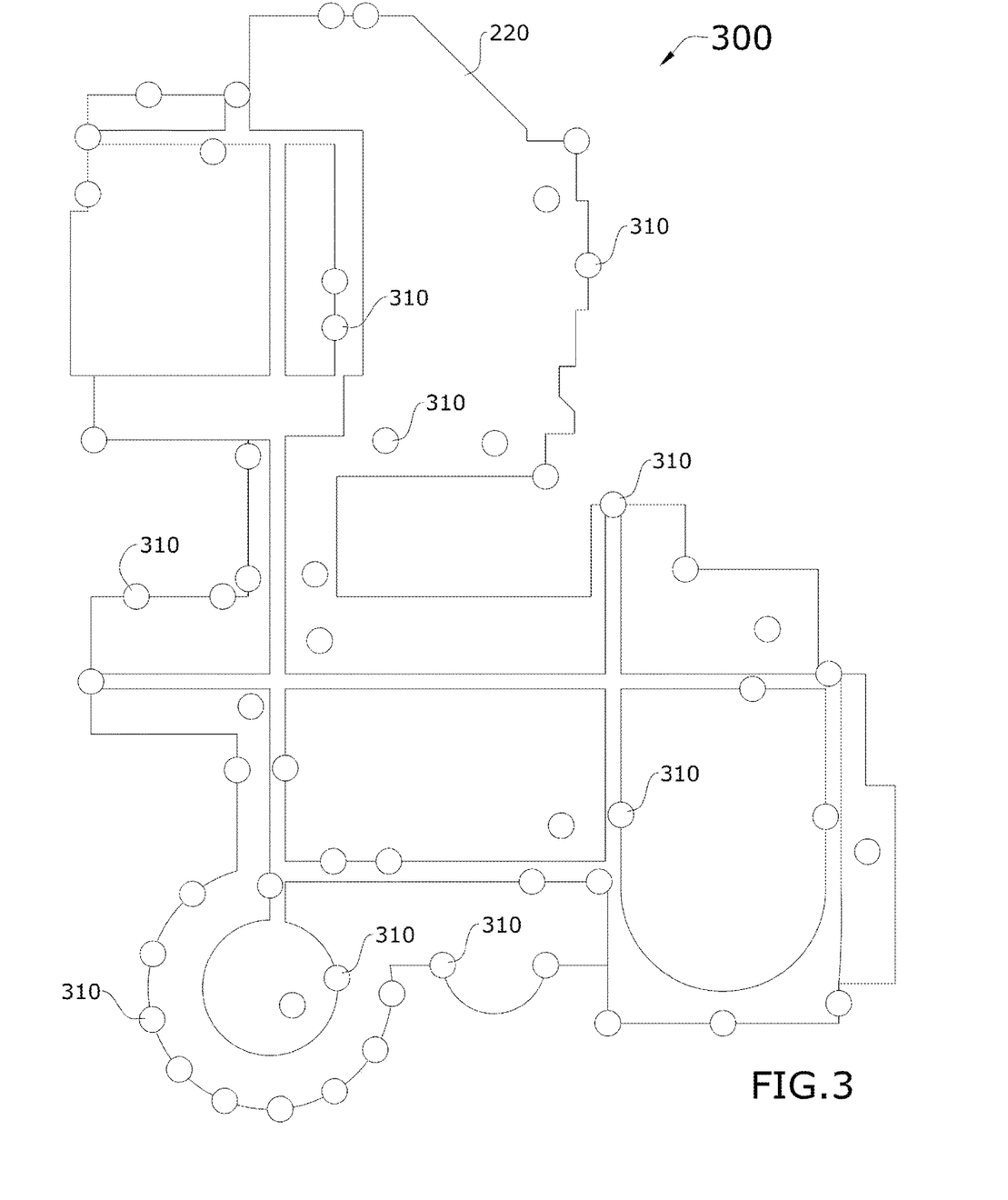
FIG. 3 conceptually illustrates a 3D facility model with markers in some embodiments.

Turning to another example, FIG. 3 conceptually illustrates a 3D facility model with markers 300 in some embodiments. As such in this figure, the 3D facility model with markers 300 includes a plurality of information markers 310 that are positioned at various locations around and in the facility 220. When a first responder view the composite facility model on their device, the information markers 310 are displayed as selectable elements. When selected, detailed information about structural or other elements at the facility is visually output for the user to read and view (including close-up visual images of the element(s)). In some embodiments, the AI system includes a machine learning (ML) system which deploys a facility AI/ML model that is trained with multiple images of each structural component and/or element at the facility, such that any first responder and capture an image of a component or element in the facility and obtain realtime information about that component or element, even in the absence of an information marker 310 in the composite facility model. In some embodiments, this is done by the AI system utilizing the image recognition AI module to compare an image uploaded from a device of a first responder to the facility model service running on (and hosted by) the remote emergency dispatch server and then analyzing the content within the image (which may include, for example, particular structural aspects within the facility whether associated with an information marker 310 or not associated with any information marker 310) to identify when the content in the facility is and provide a descriptive textual explanation back to the first responder on his/her device, along with possible other associated information, such as renders of the same, images of the same, connected components, warnings for hazardous items, etc. In some embodiments, the content in the image captured by the device and uploaded by the first responder may be blurry or include other image artifacts that render a clear image impossible, such as smoke, or in the event of a bomb/explosion, partially destroyed component/element surrounded by debris, detritus, etc. In this way, even when the composite facility model does not include an information marker 310 for any single or multiple aspects, structural items/components, etc., within or around the facility, the first responder is able to obtain the requisite information in realtime to make decisions related to the crisis.

Also, in some embodiments, each uploaded image from a first responder device is added to a training set to retrain the facility AI/ML model, along with related images, renderings, textual data, etc., related to the uploaded image. For instance, the AI system of some embodiments is configured to search the internet for clean and clear images or renderings of structural elements and other items that correspond to the subject content in any uploaded image from a first responder, especially when the subject content is blurry, cloudy, destroyed, or otherwise obscured or obliterated. In this way, the facility AI/ML model is further retrained to associate such malformed or incomplete/obscured imagery with clean imagery/renderings of the same, thereby allowing future first responders to quickly make sense of what they may be seeing. Additionally, updated and new information markers 310 are added to the composite facility model as such additional learned/ML trained information becomes available in the facility AI/ML model.

To make the intelligent structural and spatial 3D realtime guidance and training security system of the present disclosure, 3D scanning technology is deployed to capture 3D scans of facilities/properties. It is possible to edits the 3D models after the capturing stage. Thus, the post editing of these scans, if any, is followed by the training of local authorities (e.g., police, fire, rescue) and the continuous monitoring to deploy the 3D scans to appropriate rescue teams at the time of the crime. In some embodiments, augmented reality (AR) and virtual reality (VR) merge with smart optical wearable devices for enhancements such as textual overlays describing room names, interior location information, mapping overlays to direct authorities internally to locations of interest (e.g., wherever the assailant is understood be located).

To use the intelligent structural and spatial 3D realtime guidance and training security system of the present disclosure, a person would set up, deploy, configure, and start operating the intelligent structural and spatial 3D realtime guidance and training security system. An example of how this technology could be used is if an active shooter came into a school. Once the shooter engaged, the police or other authorized authorities would be able to directly access the 3D model of the interior of the school. This is a highly accurate model that allows communication within the model. Messages such as "shooter is in this part of the facility" could be linked to message to the police. When police hit the link they would be taken immediately to the area within the scan. The scan can be updated regularly throughout the incident.

Figure 4:
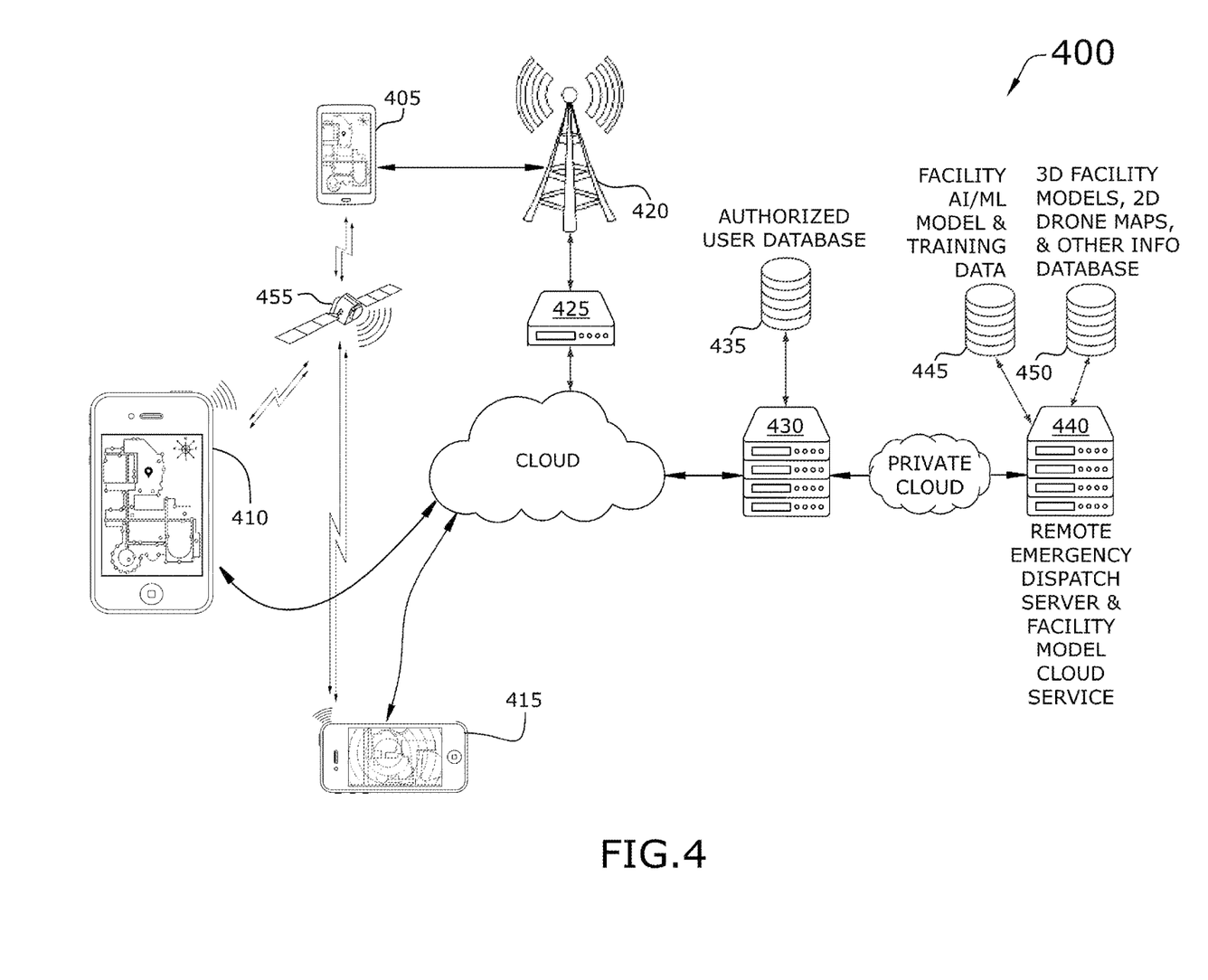
FIG. 4 conceptually illustrates a network architecture of an intelligent structural and spatial 3D realtime guidance and training security system that hosts a facility model cloud application service in some embodiments.

By way of example, FIG. 4 conceptually illustrates a network architecture of an intelligent structural and spatial 3D realtime guidance and training security system 400 that hosts a facility model cloud application service in some embodiments.

As shown in this figure, the intelligent structural and spatial 3D realtime guidance and training security system 400 includes a first device 405 of a first user, a second device 410 of a second user, and a third device 415 of a third user. The intelligent structural and spatial 3D realtime guidance and training security system 400 also include a communications tower 420 (i.e., a cell tower 420), a gateway device 425, a web and mobile app gateway server 430, an authorized user database 435, a remote emergency dispatch server and facility model cloud service 440, a facility AI/ML model & training data database 445, a facility model database 450 that stores 3D facility models, 2D drone maps, first responder information, information markers and associated data/content, fluid layer data for live orientation compass and pin locator elements, and other such data about each facility, and a GPS satellite 455.

In this example, the first device 405 of the first user is connected to the web and mobile app gateway server 430 over the communications tower 420 and gateway device 425. By such connection, the first user would be authenticated by entering user credentials, such as a username and password, which the web and mobile app gateway server 430 checks by lookup in the authorized user database 435. When duly authenticated, the first user is recognized by the web and mobile app gateway server 430 as an authorized user and permitted to access the remote emergency dispatch server and facility model cloud service 440 via private cloud connection. The connection allows for a session to start in which the remote emergency dispatch server and facility model cloud service 440 can deploy a composite facility model (assuming a crisis triggered this deployment) by transmission to the first device 405. In this case, a 3D facility model with information markers is displayed on a screen of the first device 405.

On the other hand, the second device 410 of the second user and the third device 415 of the third user are connected via WiFi or other wireless protocol over the Internet (labeled "cloud" in this figure) to the web and mobile app gateway server 430. The second and third users thus perform logins by entering user credentials, which are then authenticated by the web and mobile app gateway server 430 checking the authorized user database 435. When the second and third users are affirmatively authenticated, they are then recognized as authorized users and permitted to access the remote emergency dispatch server and facility model cloud service 440 via private cloud connection. Note that any one of the first, second, or third users may be an emergency dispatch unit user with different access, viewing, and interaction permissions that first responder users. Either way, the permissions are set out in their respective user credential and permissions records in the authorized user database 435 and the remote emergency dispatch server and facility model cloud service 440 abides by the permissions for each authorized user. So, if/when the second and third users are determined (by permissions) to be first responders with authority to access/receive, view, and interact with a composite facility model, and upon a crisis at a facility occurring, the remote emergency dispatch server and facility model cloud service 440 starts to transmit (deploy) the composite facility model to those users (i.e., by transmission to the second device 410 and the third device 415, respectively). In this case, the 3D facility model with information markers is displayed on a screen of the second device 410 while a 2D drone map view is displayed on the screen of the third device 415.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 5:
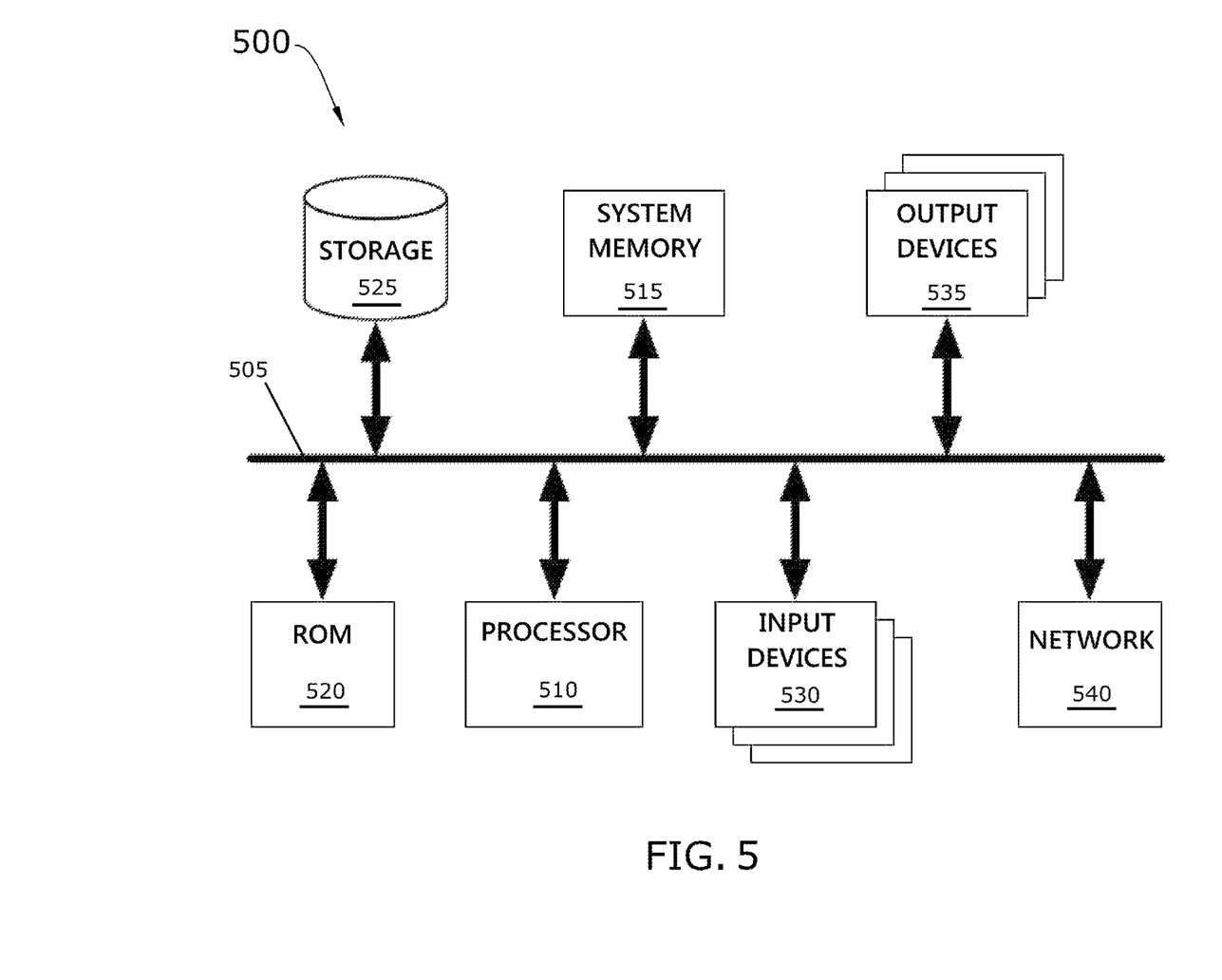
FIG. 5 conceptually illustrates an electronic system with which some embodiments of the invention are implemented.

FIG. 5 conceptually illustrates an electronic system 500 with which some embodiments of the invention are implemented. The electronic system 500 may be a computer, phone (cell phone, mobile phone, smartphone, etc.), PDA (iPod, other handheld computing device, etc.), or any other sort of electronic device or computing device. Such an electronic system includes various types of computer readable media and interfaces for various other types of computer readable media. Electronic system 500 includes a bus 505, processing unit(s) 510, a system memory 515, a read-only memory 520, a permanent storage device 525, input devices 530, output devices 535, and a network 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525.

From these various memory units, the processing unit(s) 510 retrieves instructions to execute and data to process in order to execute the processes of the invention. The processing unit(s) may be a single processor or a multi-core processor in different embodiments.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 525.

Other embodiments use a removable storage device (such as a floppy disk or a flash drive) as the permanent storage device 525. Like the permanent storage device 525, the system memory 515 is a read-and-write memory device. However, unlike storage device 525, the system memory 515 is a volatile read-and-write memory, such as a random access memory. The system memory 515 stores some of the instructions and data that the processor needs at runtime. In some embodiments, the invention's processes are stored in the system memory 515, the permanent storage device 525, and/or the read-only memory 520. For example, the various memory units include instructions for processing appearance alterations of displayable characters in accordance with some embodiments. From these various memory units, the processing unit(s) 510 retrieves instructions to execute and data to process in order to execute the processes of some embodiments.

The bus 505 also connects to the input and output devices 530 and 535. The input devices enable the user to communicate information and select commands to the electronic system. The input devices 530 include alphanumeric keyboards and pointing devices (also called "cursor control devices"). The output devices 535 display images generated by the electronic system 500. The output devices 535 include printers and display devices, such as liquid crystal displays (LCD) and organic light emitting diode (OLED) displays. Some embodiments include devices such as a touchscreen that functions as both input and output devices.

Finally, as shown in FIG. 5, bus 505 also couples electronic system 500 to a network 540 through a network adapter (not shown). In this manner, the computer can be a part of a network of computers (such as a local area network ("LAN"), a wide area network ("WAN"), or an intranet), or a network of networks (such as the facility model cloud application service hosted by the intelligent structural and spatial 3D realtime guidance and training security system 400 accessed over the Internet, as described above, by reference to FIG. 4). Any or all components of electronic system 500 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 1 conceptually illustrates a process in which the specific operations of the process may not be performed in the exact order shown and described. Specific operations may not be performed in one continuous series of operations, and different specific operations may be performed in different embodiments. Furthermore, the process could be implemented using several sub-processes (e.g., the initial steps of creating a 3D facility model versus the steps for deploying and using a composite facility map during a crisis at a facility), or as part of a larger macro process. Thus, one of ordinary skill in the art would understand that the invention is not to be limited by the foregoing illustrative details, but rather is to be defined by the appended claims.

I claim:

1. An intelligent structural and spatial three dimensional (3D) realtime guidance and training security process comprising:

scanning a facility via a 3D system;

generating a 3D facility model based on the scanning;

capturing a two dimensional (2D) drone view of the facility;

detecting vulnerabilities of the facility;

addressing the detected vulnerabilities of the facility in the 3D facility model;

generating a composite facility model by packaging the 3D facility model, the 2D drone view of the facility, and first responder information;

maintaining and updating the 3D facility model, the 2D drone view, and the first responder information in the composite facility model;

providing the composite facility model to an emergency dispatch unit;

deploying the composite facility model to authorized first responders by the emergency dispatch unit upon occurrence of a crisis at the facility;

receiving the composite facility model at a user device of a particular authorized first responder;

extracting and decrypting the 3D facility model, the 2D drone view, and the other information from the composite facility model on the user device;

visually outputting the 3D facility model extracted and decrypted from the composite facility model on a screen of the user device for the particular authorized first responder to view and interact with; and monitoring activity of the particular authorized first responder in realtime in pursuit of an approximate location of the crisis to perform first responder duties.

2. The intelligent structural and spatial 3D realtime guidance and training security process of claim 1, wherein the 3D system comprises a light detection and ranging (LiDAR) scanning system.

3. The intelligent structural and spatial 3D realtime guidance and training security process of claim 1, wherein the 2D drone view comprises a top-down view of the facility.

4. The intelligent structural and spatial 3D realtime guidance and training security process of claim 1, wherein visually outputting the 3D facility model comprises:
   adding a first fluid layer comprising a live orientation compass element to the visually output 3D facility model; and
   adding a second fluid layer comprising a pin locator visual element that specifies an approximate location of the crisis to the visually output 3D facility model.

5. The intelligent structural and spatial 3D realtime guidance and training security process of claim 1 further comprising adding information markers to the 3D facility model, wherein the information markers are selectable by authorized users and correspond to detailed information about elements and structural components within and around the facility.

6. The intelligent structural and spatial 3D realtime guidance and training security process of claim 1, wherein the crisis comprises a criminal incident at the facility and the first responders use the composite facility model for guidance to the approximate crisis location.

7. The intelligent structural and spatial 3D realtime guidance and training security process of claim 1, wherein an artificial intelligence (AI) and machine learning (ML) system comprises an image recognition AI module that is configured to compare images of particular structural aspects in the facility and provide detailed information about the structural aspects and detailed location information to a requesting first responder.

8. An intelligent structural and spatial three dimensional (3D) realtime guidance and training security process comprising:
   scanning a facility via a 3D system;
   generating a 3D facility model based on the scanning;
   capturing a two dimensional (2D) drone view of the facility;
   detecting vulnerabilities of the facility, wherein detecting vulnerabilities of the facility comprises a special weapons and tactics (SWAT) team reviewing the facility to identify the vulnerabilities;
   addressing the detected vulnerabilities of the facility in the 3D facility model;
   generating a composite facility model by packaging the 3D facility model, the 2D drone view of the facility, and first responder information;
   maintaining and updating the 3D facility model, the 2D drone view, and the first responder information in the composite facility model;
   providing the composite facility model to an emergency dispatch unit;
   deploying the composite facility model to authorized first responders by the emergency dispatch unit upon occurrence of a crisis at the facility; and
   monitoring activity of first responders in realtime in pursuit of an approximate location of the crisis to perform first responder duties.

9. The intelligent structural and spatial 3D realtime guidance and training security process of claim 8, wherein the 3D system comprises a light detection and ranging (LiDAR) scanning system.

10. The intelligent structural and spatial 3D realtime guidance and training security process of claim 8, wherein the 2D drone view comprises a top-down view of the facility.

11. The intelligent structural and spatial 3D realtime guidance and training security process of claim 6 further comprising adding information markers to the 3D facility model, wherein the information markers are selectable by authorized users and correspond to detailed information about elements and structural components within and around the facility.

12. The intelligent structural and spatial 3D realtime guidance and training security process of claim 8, wherein the crisis comprises a criminal incident at the facility and the first responders use the composite facility model for guidance to the approximate crisis location.

13. The intelligent structural and spatial 3D realtime guidance and training security process of claim 8, wherein an artificial intelligence (AI) and machine learning (ML) system comprises an image recognition AI module that is configured to compare images of particular structural aspects in the facility and provide detailed information about the structural aspects and detailed location information to a requesting first responder.

14. An intelligent structural and spatial three dimensional (3D) realtime guidance and training security process comprising:
   scanning a facility via a 3D system;
   generating a 3D facility model based on the scanning;
   capturing a two dimensional (2D) drone view of the facility;
   detecting vulnerabilities of the facility;
   addressing the detected vulnerabilities of the facility in the 3D facility model;
   generating a composite facility model by packaging the 3D facility model, the 2D drone view of the facility, and first responder information;
   maintaining and updating the 3D facility model, the 2D drone view, and the first responder information in the composite facility model;
   deploying the composite facility model for training, wherein the training comprises training authorities how to access a plurality of composite facility models corresponding to a plurality of different facilities in a jurisdiction covered by the authorities and first responders;
   providing the composite facility model to an emergency dispatch unit;
   deploying the composite facility model to authorized first responders by the emergency dispatch unit upon occurrence of a crisis at the facility; and monitoring activity of first responders in realtime in pursuit of an approximate location of the crisis to perform first responder duties.

15. The intelligent structural and spatial 3D realtime guidance and training security process of claim 14, wherein the 3D system comprises a light detection and ranging (LiDAR) scanning system.

16. The intelligent structural and spatial 3D realtime guidance and training security process of claim 14, wherein the 2D drone view comprises a top-down view of the facility.

17. The intelligent structural and spatial 3D realtime guidance and training security process of claim 14 further comprising adding information markers to the 3D facility model, wherein the information markers are selectable by authorized users and correspond to detailed information about elements and structural components within and around the facility.

18. The intelligent structural and spatial 3D realtime guidance and training security process of claim 14, wherein the crisis comprises a criminal incident at the facility and the first responders use the composite facility model for guidance to the approximate crisis location.

19. The intelligent structural and spatial 3D realtime guidance and training security process of claim 14, wherein an artificial intelligence (AI) and machine learning (ML) system comprises an image recognition AI module that is configured to compare images of particular structural aspects in the facility and provide detailed information about the structural aspects and detailed location information to a requesting first responder.

* * * * *